(12) United States Patent
Sato

(10) Patent No.: US 9,343,761 B2
(45) Date of Patent: May 17, 2016

(54) FUEL CELL AND FUEL CELL STACK

(75) Inventor: Kenji Sato, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 350 days.

(21) Appl. No.: 13/991,598

(22) PCT Filed: Dec. 5, 2011

(86) PCT No.: PCT/IB2011/002934
§ 371 (c)(1),
(2), (4) Date: Jun. 4, 2013

(87) PCT Pub. No.: WO2012/076956
PCT Pub. Date: Jun. 14, 2012

(65) Prior Publication Data
US 2013/0260281 A1    Oct. 3, 2013

(30) Foreign Application Priority Data

Dec. 6, 2010   (JP) .................................. 2010-271956

(51) Int. Cl.
| H01M 8/04 | (2006.01) |
| H01M 8/00 | (2016.01) |
| H01M 8/02 | (2016.01) |
| H01M 8/24 | (2016.01) |
| H01M 8/10 | (2016.01) |

(52) U.S. Cl.
CPC .......... *H01M 8/04746* (2013.01); *H01M 8/006* (2013.01); *H01M 8/0232* (2013.01); *H01M 8/0271* (2013.01); *H01M 8/0273* (2013.01); *H01M 8/2465* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

2009/0098435 A1 * 4/2009 Shibata et al. .................. 429/32
2010/0167171 A1 * 7/2010 Sasaoka ........................ 429/508

FOREIGN PATENT DOCUMENTS

| EP | 1978585 A1 | 10/2008 |
| EP | 2045861 A1 | 4/2009 |
| JP | 2005197150 A | 7/2005 |
| JP | 2008004494 A | 1/2008 |
| JP | 2008171587 A | 7/2008 |
| JP | 2009099312 A | 5/2009 |
| JP | 2009134948 A * | 6/2009 |
| JP | 2009266692 A | 11/2009 |
| JP | 2010080201 A | 4/2010 |
| JP | 2010165473 A | 7/2010 |
| JP | 2010205593 A | 9/2010 |
| WO | 2007/080518 A1 | 7/2007 |
| WO | WO 2007080518 A1 * | 7/2007 |
| WO | 2008/096227 A1 | 8/2008 |

* cited by examiner

*Primary Examiner* — Daniel Gatewood
(74) *Attorney, Agent, or Firm* — Kenyon & Kenyon LLP

(57) ABSTRACT

A fuel cell includes: a membrane electrode assembly having an electrolyte membrane, an anode disposed on one side of the electrolyte membrane, and a cathode disposed on the other side thereof; a porous passage that is disposed on at least one side of the membrane electrode assembly, and through which a fuel gas is supplied to the anode or an oxidant gas is supplied to the cathode; and a manifold portion-, through which the fuel gas or the oxidant gas is supplied to the porous passage, and that is provided so as to pass through the fuel cell in a stacking direction, in which the electrolyte membrane, the anode, the cathode, and the porous passage are stacked, wherein a manifold portion-side end portion of the porous passage has a gas inlet at least one of stacking surfaces of the porous passage that face in the stacking direction.

9 Claims, 5 Drawing Sheets

FUEL CELL AND FUEL CELL STACK

This is a 371 national phase application of PCT/IB2011/002934 filed 5 Dec. 2011, claiming priority to Japanese Patent Application No. 2010-271956 filed 6 Dec. 2010, the contents of which are incorporated herein by reference.

BACKGROUND OF THE INVENTION

1. Field of the Invention

The invention relates to a fuel cell and a fuel cell stack. More specifically, the invention relates to a fuel cell including a metal porous body that serves as a gas passage layer, and a fuel cell stack including the fuel cell.

2. Description of Related Art

A polymer electrolyte fuel cell includes a membrane electrode assembly that is fowled by stacking a catalyst layer and a gas diffusion layer, in this order, on each side of an ion-permeable electrolyte membrane. The membrane electrode assembly is held between two gas passage layers, and the membrane electrode assembly held between the gas passage layers are held between two separators. In this way, a single cell is formed. Multiple cells are assembled together to form a fuel cell stack. Fuel gas that contains hydrogen is supplied to an anode (negative electrode), and an electrochemical reaction expressed by formula (1) below occurs, thereby producing protons from the fuel gas at the anode. The produced protons pass through the electrolyte membrane to reach a cathode (positive electrode). Oxidant gas that contains oxygen is supplied to the cathode (positive electrode), and an electrochemical reaction expressed by formula (2) below occurs, in which the oxygen reacts with protons from the anode (negative electrode), so that water is produced. The electrochemical reactions that occur at the electrolyte membrane-side surfaces of the paired electrodes are used to obtain electric energy from the electrodes.

Anode reaction: $H_2 \rightarrow 2H^+ + 2e^-$     (1)

Cathode reaction: $2H^+ + 2e^- + (\frac{1}{2})O_2 \rightarrow H_2O$     (2)

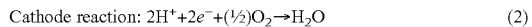

A fuel cell configured as described above is available, in which a metal porous body that is excellent in gas diffusion properties and electrical conductivity is used as the gas passage layer in order to supply fuel gas or oxidant gas to the electrode and collect electricity generated through the electrochemical reactions. Examples of the metal porous body include an expanded metal and a sintered metal foam. Conventional methods for producing the metal porous body include cutting and expanding a titanium sheet, a stainless steel sheet, or the like. For example, slits are made in a titanium sheet, a stainless steel sheet, or the like in a staggered manner and the sheet with slits is expanded by being stretched so that a mesh metal sheet, that is, an expanded metal is obtained.

The metal porous body obtained by cutting and expanding a metal sheet, in the above-described manner is cut into pieces having a given size in accordance with the external dimensions of the fuel cell. The obtained pieces are disposed on the respective sides of the membrane electrode assembly so that the fuel cell is faulted. The metal porous body may be cut into pieces by a laser cutter, or with the use of a die (Japanese Patent Application Publication No. 2010-80201 (JP-A-2010-80201)). With this method, a surface pressure or heat applied to the metal porous body may break an end surface of the metal porous body, which is a cut end surface, thereby causing clogging of pores. As shown in FIG. 7, an end surface 40 of a metal porous body functions as an inlet for gas that is supplied through a gas supply manifold portion 20. Therefore, clogging of the pores in an end surface portion of the metal porous body increases loss of gas introduction pressure, which may decrease, for example, the amount of gas that is supplied to the electrode, gas diffusivity, and electric power generation performance of the fuel cell.

SUMMARY OF THE INVENTION

The invention provides a fuel cell in which a sufficient amount of fuel gas or oxidant gas is supplied to an electrode regardless of the degree of clogging at an end surface portion of a metal porous body, and also provides a fuel cell stack including the fuel cell.

A first aspect of the invention is a fuel cell that includes: a membrane electrode assembly including an electrolyte membrane, an anode disposed on one side of the electrolyte membrane, and a cathode disposed on the other side of the electrolyte membrane; a porous passage that is disposed on at least one side of the membrane electrode assembly, and through which a fuel gas is supplied to the anode or an oxidant gas is supplied to the cathode; and a manifold portion, through which the fuel gas or the oxidant gas is supplied to the porous passage; and that is provided so as to pass through the fuel cell in a stacking direction, in which the electrolyte membrane, the anode, the cathode, and the porous passage are stacked, wherein a manifold portion-side end portion of the porous passage has a gas inlet at at least one of stacking surfaces of the porous passage that face in the stacking direction.

According to the first aspect, the porous passage that supplies the fuel gas or the oxidant gas has gas inlets at an end surface and at at least one of the stacking surfaces that face in the direction in which the membrane electrode assembly and the porous flow path are stacked. Therefore, regardless of the degree of clogging at the end surface portion of the porous passage, the fuel gas or the oxidant gas is reliably introduced into the porous passage through the stacking surface. Further, the gas inlet is not merely provided at the stacking surface of the porous passage, that is, the gas inlet is provided at the stacking surface(s) of the end portion of the porous passage, so that a power generation area of the membrane electrode assembly is not reduced. Thus, it is possible to improve the gas introduction efficiency while maintaining a sufficient size of power generation area. This makes it possible to reliably supply the fuel gas or the oxidant gas to the membrane electrode assembly and to improve the power generation performance of the fuel cell stack.

The fuel cell according to the first aspect may further include: a sealing member that is disposed between an outer end surface of the membrane electrode assembly and the manifold portion; and a shield member that is disposed between the sealing member and the porous passage, wherein a manifold portion-side end portion of the shield member extends further outward, with respect to the fuel cell, than a manifold portion-side end portion of the sealing member.

According to the fuel cell configured as described above, it is possible to prevent the situation where the sealing member adjacent to the porous passage permeates and clogs the pores of the porous passage, which may result in blockage of the gas inlet. Consequently, it is possible to reliably cause the fuel gas or the oxidant gas to flow from the gas inlet to the membrane electrode assembly and to be supplied thereto.

Further, in the fuel cell according to the first aspect, the manifold portion-side end portion of the porous passage may project into the manifold portion. Further, in the fuel cell, the manifold portion-side end portion of the shield member may extend further outward, with respect to the fuel cell, than the manifold portion-side end portion of the porous passage.

According to the fuel cell configured as described above, the fuel gas or the oxidant gas that passes through the manifold portion naturally flows into the porous passage. Therefore, the efficiency of the gas introduction from the manifold portion is improved. Further, the shield member can change the flow direction of the gas. This further facilitates the gas introduction into the porous passage, and promotes the gas introduced into the porous passage to flow further inward (inward in the fuel cell). Thus, it is possible to efficiently introduce a sufficient amount of fuel gas or oxidant gas into the porous passage and facilitate gas flow through the porous passage, thereby improving the power generation performance of the fuel cell stack.

The fuel cell according to the first aspect may further include: a sealing member that is disposed adjacent to a manifold portion-side end portion of the membrane electrode assembly, wherein a manifold portion-side end portion of one of the anode and cathode that is in contact with the porous passage extends further outward, with respect to the fuel cell, than a manifold portion-side end portion of the sealing member.

In the fuel cell according to the first aspect, a configuration may be employed, in which a separator having a projecting portion is disposed on one side of the membrane electrode assembly with the porous passage interposed between the separator and the membrane electrode assembly, the manifold portion and a space formed by the projecting portion of the separator communicate with each other, and the porous passage is provided such that a manifold portion-side edge of the porous passage is located at a position within a width of the projecting portion of the separator.

According to the fuel cell configured as described above, it is possible to introduce the fuel gas or the oxidant gas into the porous passage while suppressing a pressure loss of the gas inside the manifold portion.

A second aspect of the invention is a fuel cell stack including the fuel cell according to the first aspect.

According to the invention, it is possible to reliably supply the fuel gas or the oxidant gas to the membrane electrode assembly regardless of a cutting condition and porosity of an end surface portion of the porous passage, thereby providing a fuel cell stack with improved power generation performance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
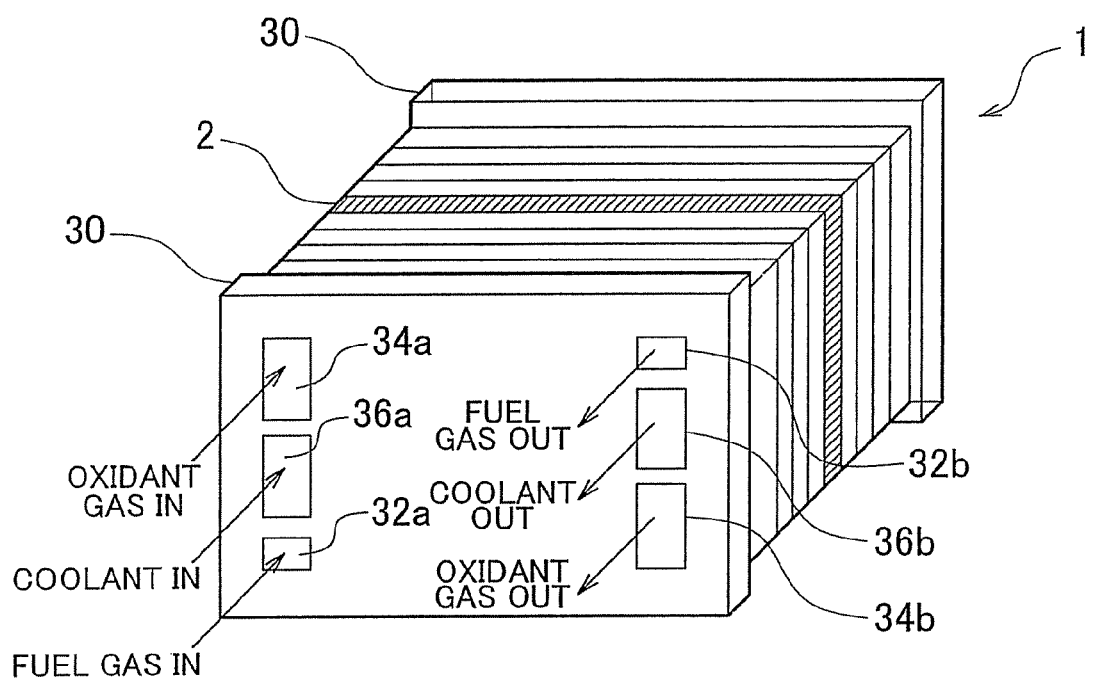
FIG. 1 shows a fuel cell stack according to an embodiment of the invention.
Figure 2A:
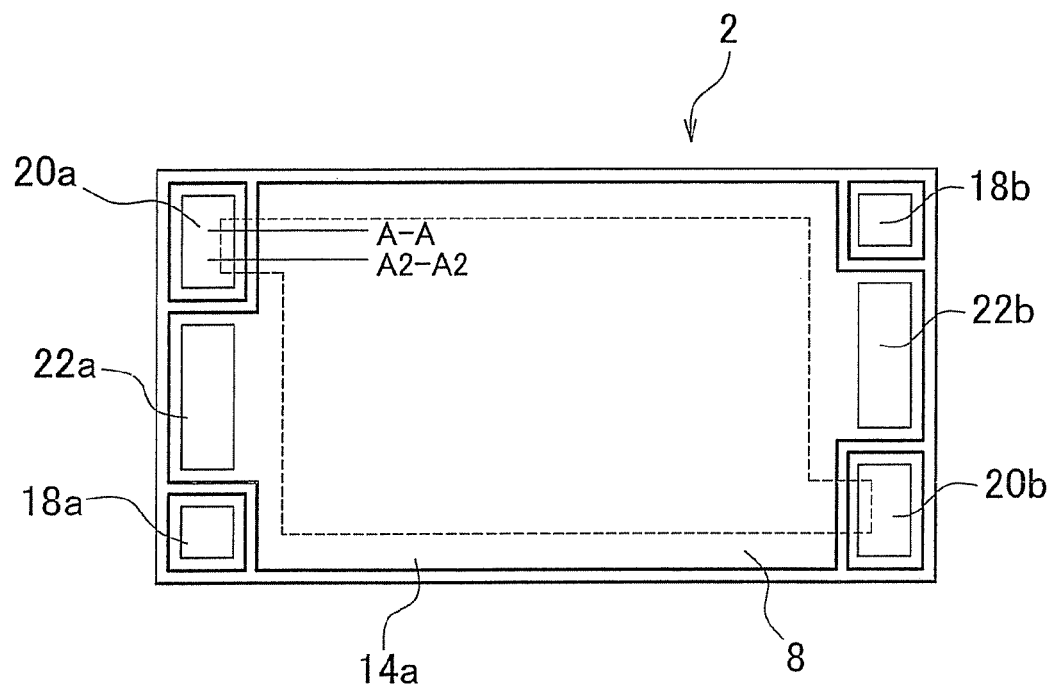
FIG. 2A is a plan view of a fuel cell according to the embodiment of the invention, viewed from a cathode side.
Figure 2B:
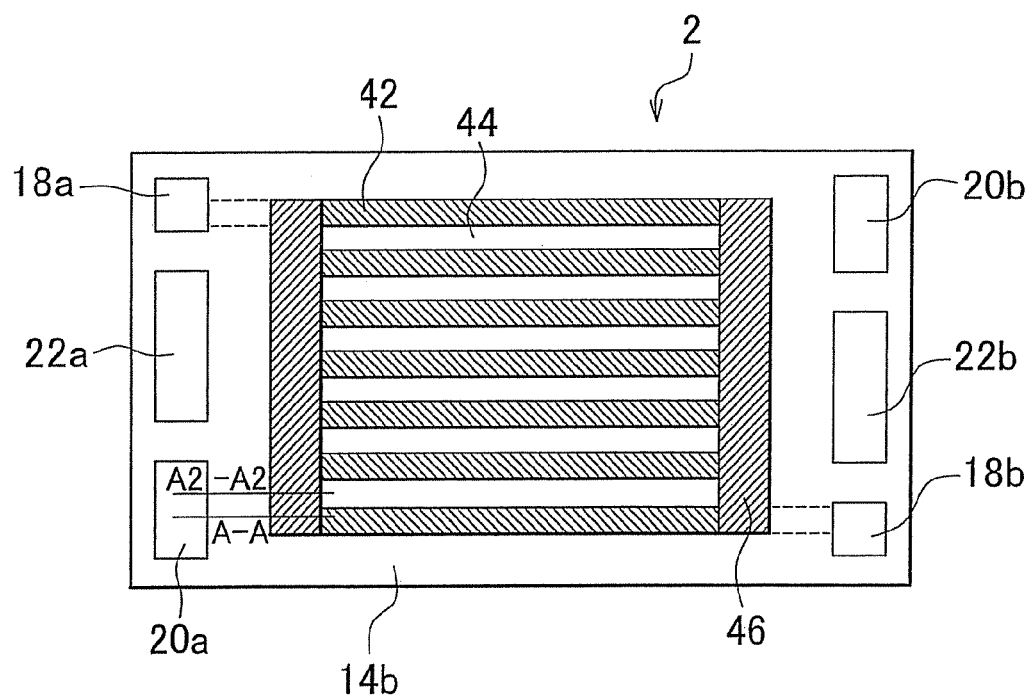
FIG. 2B is a plan view of the fuel cell according to the embodiment of the invention, viewed from an anode side.
Figure 3A:
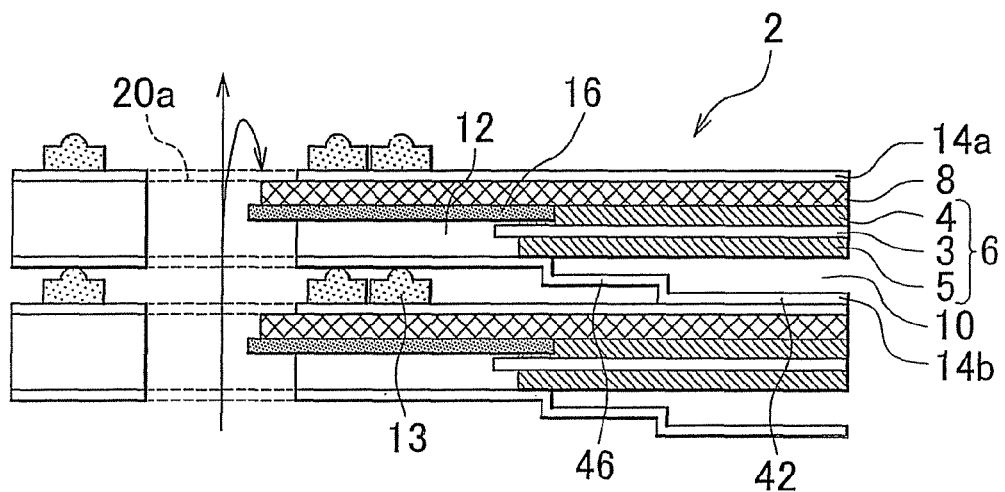
FIG. 3A is a sectional view of a fuel cell according to a first embodiment of the invention, taken along the line A-A in FIGS. 2A and 2B.
Figure 3B:
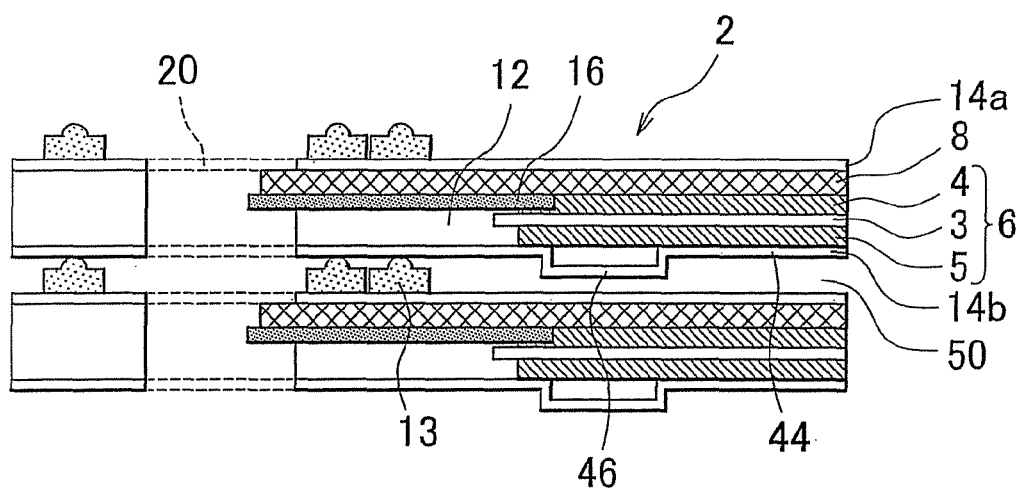
FIG. 3B is a sectional view of the fuel cell according to the first embodiment of the invention, taken along the line A2-A2 in FIGS. 2A and 2B.

Hereafter, a first embodiment of the invention will be described with reference to FIGS. 1, 2A, 2B, 3A and 3B. FIG. 1 shows a fuel cell stack 1. FIG. 2A is a plan view of a fuel cell 2 (hereinafter also referred to as "cell 2") viewed from the cathode side. FIG. 2B is a plan view of the cell 2 viewed from the anode side. That is, FIG. 2A shows one side of the cell 2, and FIG. 2B shows the other side of the cell 2. FIG. 3A is a sectional view taken along the line A-A in FIGS. 2A and 2B. FIG. 3B is a sectional view taken along the line A2-A2 in FIGS. 2A and 2B. As shown in FIG. 1, the fuel cell stack 1 is formed by stacking a plurality of unit cells 2. The stacked cells 2 are electrically connected in series. Electric currents obtained through electric power generation at the cells 2 are collected at two current collector plates 30 that are provided at respective ends in a stacking direction of the stacked cells 2. The collected electric currents are supplied to electric apparatuses such as an electric load and a secondary battery. Note that, although the fuel cell stack 1 is formed by stacking the multiple fuel cells 2 in the first embodiment, the fuel cell stack 1 may include only one fuel cell 2.

The current collector plate 30 of the fuel cell stack 1 has a fuel gas inlet 32a, an oxidant gas inlet 34a, and a coolant inlet 36a through which a fuel gas, an oxidant gas, and a coolant are respectively introduced into the fuel cell stack 1. Further, the current collector plate 30 has a fuel gas outlet 32b, an oxidant gas outlet 34b, and a coolant outlet 36b through which the fuel gas, the oxidant gas, and the coolant are respectively discharged from the fuel cell stack 1.

As shown in FIG. 2A, the cell 2 has, at an end portion of the outer periphery thereof, a fuel gas supply manifold portion 18a, an oxidant gas supply manifold portion 20a, and a coolant supply manifold portion 22a. The cell 2 also has, at another end portion of the outer periphery thereof, a fuel gas discharge manifold portion 18b, an oxidant gas discharge manifold portion 20b, and a coolant discharge manifold portion 22b at positions that are opposed to the positions of the above corresponding supply manifold portions. These supply and discharge manifold portions are each provided so as to pass through the cell 2 in the direction in which the cells 2 are stacked (hereinafter, referred to as "stacking direction"). When the cells 2 are stacked, passages for the fuel gas, the oxidant gas, and the coolant are formed.

The fuel gas supply manifold portion 18a, the oxidant gas supply manifold portion 20a, and the coolant supply manifold portion 22a communicate with the fuel gas inlet 32a, the oxidant gas inlet 34a, and the coolant inlet 36a, respectively, which are formed in the current collector plate 30 of the fuel cell stack 1. Similarly, the fuel gas discharge manifold portion 18b, the oxidant gas discharge manifold portion 20b, and the coolant discharge manifold portion 22b communicate with the fuel gas outlet 32b, the oxidant gas outlet 34b, and the coolant outlet 36b, respectively, which are formed in the current collector plate 30 of the fuel cell stack 1.

The fuel gas is supplied to each cell 2 through the fuel gas supply manifold portion 18a thereof, flows diagonally inside the cell 2, and is discharged from the cell 2 through the fuel gas discharge manifold portion 18b thereof. Similarly, the oxidant gas is supplied to each cell 2 through the oxidant gas supply manifold portion 20a thereof, flows diagonally inside the cell 2, and is discharged from the cell 2 through the oxidant gas discharge manifold portion 20b thereof. The coolant is supplied to each cell 2 through the coolant supply manifold portion 22a thereof, flows through gaps between this cell 2 and another cell 2 that is positioned next to this cell 2, and is discharged from this cell 2 through the coolant discharge manifold portion 22b thereof. Note that in the first embodiment, the fuel gas supply manifold portion 18a and the oxidant gas supply manifold portion 20a are positioned diagonally opposite to the fuel gas discharge manifold portion 18b and the oxidant gas discharge manifold portion 20b, respectively. However, the positions of the manifold portions and the flow directions of the gases may be changed as needed, as long as the fuel gas flows on one side of separator and the oxidant gas flows on the other side of the separator.

As shown in FIG. 2B, when viewed from the anode side, the cell 2 has various manifold portions at the end portions of the outer periphery thereof. The cell 2 has a recess, which is a projection on the back side, at a central portion thereof that forms passages extending from the coolant supply manifold portion 22a to the coolant discharge manifold portion 22b. Assuming that the cathode side is a front side and the anode side is a back side, the recess (projection) is formed by recessed portions 42 and projected portions 44. The fuel gas flows along the recessed portions 42 and the coolant flows along the projected portions 44. Further, stepped portions 46 are provided between the manifold portions at the end portions of the outer periphery and the recess (projection) at the central portion. One of the stepped portions 46 communicates with the fuel gas supply manifold portion 18a and the recessed portions 42, and causes the fuel gas supplied through the fuel gas manifold portion 18a further inward.

FIG. 3A is a sectional view taken along the line A-A in FIG. 2A, and the arrows indicate how the oxidant gas is supplied to the cathode. The cell 2 includes a membrane electrode assembly 6, a cathode-side porous passage 8, an anode-side groove passage 10, a sealing member 12, separators 14a and 14b, and a shield member 16. Note that FIGS. 3A, 3B, 4, 5, and 6 each show only left portions of the two cells 2 stacked. Note that reference numerals are assigned only to the components of the upper cell 2.

The membrane electrode assembly 6 is fowled of an ion-conductive electrolyte membrane 3, a cathode 4 that is disposed on one side of fife electrolyte membrane 3, and an anode 5 that is disposed on the other side of the electrolyte membrane 3. Protons and electrons are produced from the fuel gas supplied to the anode 5. The protons pass through the electrolyte membrane 3 to reach the cathode 4. These protons react with the oxidant gas supplied to the cathode 4, whereby electric energy and water are produced. Examples of materials for the membrane electrode assembly 6 include the following. That is, an ion-exchange resin having a fluorine-containing polymer as a skeleton may be used as the material for the electrolyte membrane 3. For the anode 4 and the cathode 5, a conductive support formed by causing a carbon material (e.g. carbon black) to support a metal catalyst such as Pt or Au, may be used.

The porous passage 8 is fowled of a metal porous body such as an expanded metal or a metal sintered body, and is provided on the cathode side of the membrane electrode assembly 6. An end portion of the porous passage 8 projects into the oxidant gas supply manifold portion 20a. The cathode-side porous passage 8 communicates with the oxidant gas supply manifold portion 20a. Through the porous passage 8, the oxidant gas introduced through the oxidant gas supply manifold portion 20a is supplied to the cathode 5 of the membrane electrode assembly 6.

The separator 14a is formed of a conductive flat plate made of metal such as aluminum or stainless steel, and is disposed on the surface of the porous passage 8, which is on the opposite side of the porous passage 8 from the membrane electrode assembly 6. The separator 14a has an opening at a position corresponding to the oxidant gas supply manifold portion 20a, whereby the passage for the oxidant gas is formed. Similarly, the separator 14a has openings at positions corresponding to the fuel gas supply manifold portion 18a, the coolant supply manifold portion 22a, the fuel gas discharge manifold portion 18b, the oxidant gas discharge manifold portion 20b, and the coolant discharge manifold portion 22b (not shown in FIGS. 3A and 3B).

The separator 14b is provided on the anode side of the membrane electrode assembly 6. Like the separator 14a, the separator 14b is made of metal such as aluminum or stainless steel. The separator 14b has the recess (projection) at its central portion thereof, which forms passages extending from the coolant supply manifold portion 22a to the coolant discharge manifold portion 22b (see FIG. 2B). The recess (projection) is formed by the recessed portions 42 and the projected portions 44. The fuel gas flows along the recessed portions 42 and the coolant flows along the projected portions 44. The separator 14b also has the stepped portions 46 between the manifold portions at the end portions of the outer periphery and the recess (projection) at the central portion. The stepped portion 46 of the separator 14b between the oxidant gas supply manifold portion 20a and the recessed portions 42 at the central portion is formed like stairs. The separator 14b is in contact with the membrane electrode assembly 6 and the sealing member 12 at the oxidant gas supply manifold portion 20a side thereof. The separator 14b is separate from the membrane electrode assembly 6 at the stepped portion 46, and is in contact with the adjacent cell at the recessed portions 42 at the central portion of the cell 2. Thus, the gap is formed between the membrane electrode assembly 6 and the separator 14b, whereby the groove passages 10 in which the fuel gas flows are formed. That is, the fuel gas supplied through the fuel gas supply manifold portion 18a (not shown in FIGS. 3A and 3B) flows through the groove passages 10 and is supplied to the anode 5.

As shown in FIG. 3B, between the oxidant gas supply manifold portion 20a and the projected portions 44 at the central portion of the cell 2, the stepped portion 46 of the separator 14b is formed so as to project in the stacking direction toward the adjacent cell. The separator 14b is in contact with the membrane electrode assembly 6 and the sealing member 12 at the oxidant gas supply manifold portion 20a side thereof. The separator 14b is separate from the membrane electrode assembly 6 at the stepped portion 46, and is in contact with the membrane electrode assembly 6 also at the projected portions 44 at the central portion of the cell 2. Thus, a space 50 is formed between the separator 14b and a separator 14a of the adjacent cell, through which the coolant flows. That is, the coolant supplied through the coolant supply manifold portion 22a (not shown in FIG. 3B) flows between the separator 14b and the adjacent cell 2 to cool the cells 2. Note that, in the first embodiment; the projections and recesses are fowled on both sides of the separator 14b, and the projections and recesses on one side match the recesses and projections on the other side, respectively. Alternatively, the separator 14b may be formed such that one side thereof is flat and the other side thereof has projections and recesses.

The shield member 16 and the sealing member 12 are disposed between the porous passage 8 and the separator 14b at the oxidant gas supply manifold portion 20a side of the cell 2. The shield member 16 is made of metal such as aluminum or stainless steel. An oxidant gas supply manifold portion 20a-side end portion of the shield member 16 extends further outward, with respect to the cell 2, than the end portion of the porous passage 8. The other end portion of the shield member 16 extends further inward, with respect to the cell 2, than the end portion of the cathode 4 so as to be held between the cathode 4 and the porous passage 8. With the structure described above, it is possible to prevent the situation where the sealing member 12 permeates and clogs the pores of the porous passage 8 to reduce porosity. Note that the feature that the end portion of the shield member 16 extends outward with respect to the cell 2 means that the end portion of the shield member 16 extends outward, with respect to the cell 2, in the plane of the shield member 16.

The sealing member 12 is provided, adjacent to an end surface of the membrane electrode assembly 6 and the groove passages 10, on the opposite side of the shield member 16 from the porous passage 8, so as to seal a gap between the oxidant gas supply manifold portion 20a, and the membrane electrode assembly 6 and the groove passages 10. Therefore, the oxidant gas supplied through the oxidant gas supply manifold portion 20a is supplied to the membrane electrode assembly 6 through the porous passage 8 without leaking to the anode 5 or the groove passages 10.

Gaskets 13 are disposed between the separator 14b of the cell 2 and the separator 14a of the adjacent cell 2. The gaps fowled between these separators 14b and 14a form passages for the coolant.

In the fuel cell 2 according to the first embodiment, the oxidant gas supplied to the oxidant gas supply manifold portion 20a is supplied to the cathode 4 through an end portion of a separator 14a-side stacking surface of the cathode-side porous passage 8, the stacking surface being a surface facing in the stacking direction. Therefore, even if the porosity of an end surface portion of the porous passage 8 is low, a sufficient amount of oxidant gas is introduced into the porous passage 8 and supplied to the cathode 4, whereby it is possible to improve the power generation performance of the fuel cell stack 1. Moreover, it is possible to prevent the situation where the sealing member 12 adjacent to the porous flow path 8 permeates the porous passage 8 to cause clogging that may result in blockage of the gas inlet. Thus, it is possible to reliably cause the fuel gas or the oxidant gas to flow from the gas inlet to the membrane electrode assembly 6 and to be supplied thereto. Further; the end portion of the stacking surface of the porous passage 8 serves as the gas inlet. Therefore, the gas inlet is adjacent to the oxidant gas supply manifold portion 20a and no complicated structure is required. Accordingly, it is possible to increase the gas introduction efficiency without reducing the power generation area (surface area), thereby achieving high power generation performance. Note that in the first embodiment, as indicated by the arrows in FIG. 3A, the oxidant gas is supplied from the anode side toward the cathode side. Alternatively, the oxidant gas may be supplied from the cathode side toward the anode side. When the oxidant gas is supplied from the anode side toward the cathode side as in the first embodiment, the direction in which the oxidant gas flows inside the manifold portion 20a and the direction in which the oxidant gas is introduced into the porous passage 8 are opposite to each other. Therefore, the gas does not rapidly flow into the porous passage 8, which makes it possible to supply gas uniformly to each cell 2 of the fuel cell stack 1. On the other hand, when the oxidant gas is supplied from the cathode side toward the anode side, the shield member 16 functions as a guide, so that the gas is more efficiently introduced into the porous passage 8.

Figure 4:
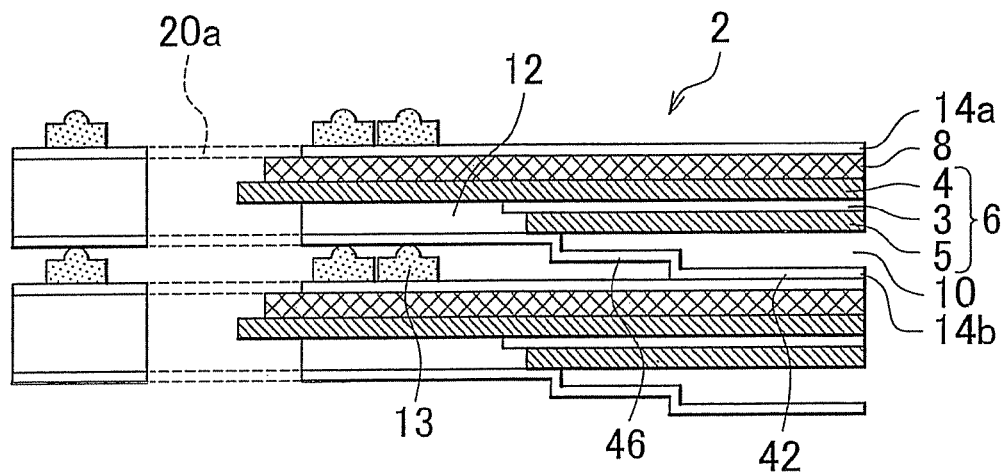
FIG. 4 is a sectional view of a fuel cell according to a second embodiment of the invention.

Next, a second embodiment will be described with reference to FIG. 4. Like FIG. 3A, FIG. 4 is a sectional view taken along the line A-A in FIGS. 2A and 2B. Portions the same in structure as those in FIG. 3A will not be described below.

In the second embodiment, the shield member 16 is not provided at the boundary between the porous passage 8 and the sealing member 12, and the end portion of the cathode electrode 4 is extended in the direction of the oxidant gas supply manifold portion 20a. At the oxidant gas supply manifold portion 20a side, the end portion of the cathode 4 extends further outward, with respect to the cell 2, than the end portion of the sealing member 12. Thus, the cathode 4 covers the electrolyte membrane 3 and the sealing member 12, thereby providing a shielding effect. Note that the feature that the end portion of the cathode electrode 4 extends outward with respect to the cell 2 means that the end portion of the cathode electrode 4 extends outward, with respect to the cell 2, in the plane of the cathode electrode 4. When a diffusion layer (not shown) is interposed between the cathode electrode 4 and the porous passage 8, the end portion of the diffusion layer, in addition to or instead of the cathode electrode 4, may extend further outward, with respect to the cell 2, than the end portion of the sealing member 12.

With the fuel cell having the above structure, the cell structure is simplified, so that it is possible to reduce the number of components. Further, the power generation area is not reduced by the shield member. Thus, it is possible to efficiently supply the fuel gas or the oxidant gas to the porous passage while ensuring a sufficient size of power generation area in the membrane electrode assembly.

Figure 5:
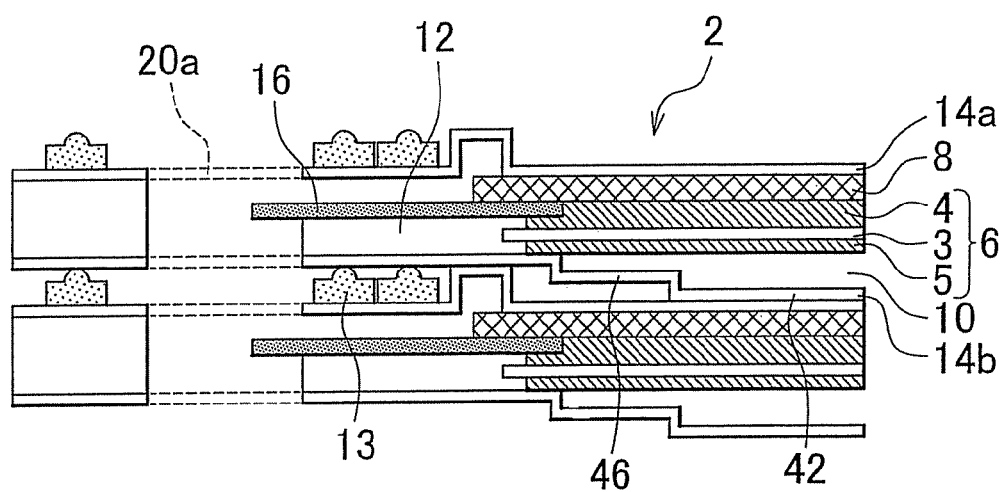
FIG. 5 is a sectional view of a fuel cell according to a third embodiment of the invention.

A third embodiment will be described with reference to FIG. 5. Like FIG. 3A, FIG. 5 is a sectional view taken along the line A-A in FIGS. 2A and 2B. Portions the same in structure as those in FIG. 3A will not be described below.

The end portion of the porous passage 8 is disposed further inward, with respect to the cell 2, than the end portion of the shield member 16 at the oxidant gas supply manifold portion 20a side. The separator 14a has a projecting portion at a position corresponding to the end portion of the porous passage 8, and the end portion of the porous passage 8 is disposed at a position corresponding to the projecting portion of the separator 14a. Therefore, the oxidant gas supplied through the oxidant gas supply manifold portion 20a is introduced through the end surface and the upper surface of the end portion of the porous passage 8 and is supplied to the membrane electrode assembly 6.

The separator 14b has a key-like bent portion along the outer periphery of the groove passages 10. The projecting portion of the separator 14a is fitted into the key-like bent portion of the separator 14b. The coolant flows through the gaps between the separator 14b and the separator 14a of the adjacent cell 2.

With the fuel cell 2 according to the third embodiment, the oxidant gas supplied to the oxidant gas supply manifold portion 20a is efficiently supplied to the cathode 4 through a portion of the upper surface of the porous passage 8 (the surface on the separator 14a side), which is located at a position corresponding to the projecting portion of the separator 14a and which serves as the gas inlet. Therefore, even when the porosity of the end surface portion of the porous passage 8 is low, a sufficient amount of oxidant gas is introduced into the porous passage 8 and supplied to the cathode 4. Further, a pressure loss of the gas passage in the oxidant gas supply manifold portion 20a is reduced. Consequently, the power generation performance of the fuel cell stack 1 is improved.

Figure 6:
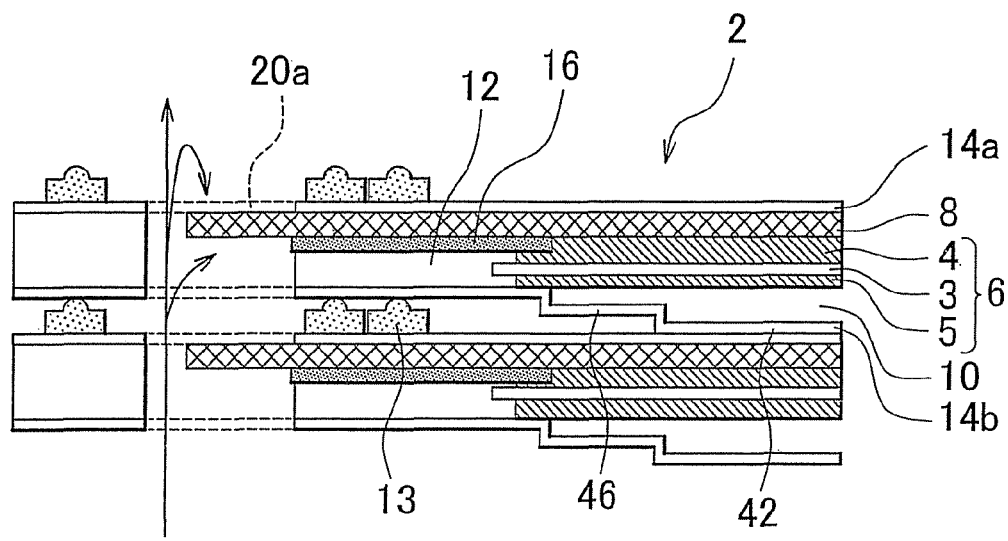
FIG. 6 is a sectional view of a fuel cell according to a fourth embodiment of the invention.
Figure 7:
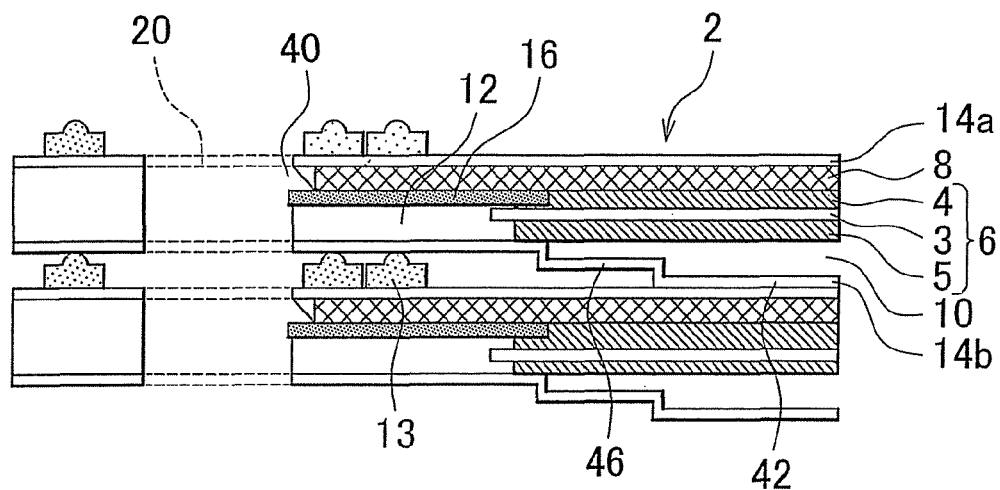
FIG. 7 is a sectional view of a fuel cell according to related art.

Next, a fourth embodiment will be described with reference to FIG. 6. Like FIG. 3A, FIG. 6 is a sectional view taken along the line A-A in FIGS. 2A and 2B. Portions the same in structure as those in FIG. 3A will not be described below.

The end portion of the porous passage 8 is disposed further outward, with respect to the fuel cell 2, than the end portion of the shield member 16, projecting into the oxidant gas supply manifold portion 20a. Note that in the fourth embodiment, the oxidant gas supply manifold portion 20a is a throughhole that is fondled by the manifold holes provided in the separators 14a, 14b, which are aligned in the stacking direction, so as to pass through the fuel cell stack. At an end portion of the fuel cell stack in the stacking direction, the oxidant gas supply manifold portion 20a communicates with the oxidant gas inlet 34a fowled in the current collector plate 30.

With the fuel cell 2 according to the fourth embodiment, the oxidant gas supplied to the oxidant gas supply manifold portion 20a is introduced into the porous passage 8 from its lower surface in the stacking direction. Then, the oxidant gas flows in two directions. That is, the oxidant gas flowing in one direction passes through the porous passage 8, is discharged into the oxidant gas supply manifold portion 20a, and flows toward the next cell 2, while the oxidant gas flowing in the other direction flows inside the porous passage 8. Further, a portion of the oxidant gas once discharged from the porous passage 8 into the oxidant gas supply manifold portion 20a turns around to be introduced into the porous passage 8 from its upper surface in the stacking direction. The oxidant gas thus introduced into the porous passage 8 from its upper and lower surfaces flows through the porous passage 8, and is supplied to the membrane electrode assembly 6. Thus, a sufficient amount of oxidant gas is introduced into the porous passage 8 from both the upper and lower stacking surfaces thereof. As result, regardless of the porosity of the end surface portion of the porous passage 8, it is possible to reliably introduce the oxidant gas into the porous passage 8, cause the oxidant gas to flow through the porous passage 8, and supply the oxidant gas to the cathode 4, thereby improving the power generation performance of the fuel cell stack 1. Note that the flow direction and the flow rate of the oxidant gas may be changed depending on the pore size and shape of the porous passage 8.

Note that in the above description of the first to fourth embodiments, specific description has been made of the mode of supplying the oxidant gas from the oxidant gas supply manifold portion 20a to the cathode side porous flow path 8. However, such embodiments are applicable also in the case of supplying the fuel gas from the fuel gas supply manifold portion 18a to an anode-side porous passage 10. In addition, in these embodiments, specific description has been made of the case where the oxidant gas flows through the oxidant gas supply manifold portion 20a from the anode side to the cathode side. However, the direction of flow of the oxidant gas is not limited to this. The oxidant gas may flow from the cathode side to the anode side.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. A fuel cell comprising:
   a membrane electrode assembly including an electrolyte membrane, an anode disposed on one side of the electrolyte membrane, and a cathode disposed on the other side of the electrolyte membrane;
   a porous passage that is disposed on at least one side of the membrane electrode assembly, and through which a fuel gas is supplied to the anode or an oxidant gas is supplied to the cathode; and
   a manifold portion, through which the fuel gas or the oxidant gas is supplied to the porous passage, and that is provided so as to pass through the fuel cell in a stacking direction, in which the electrolyte membrane, the anode, the cathode, and the porous passage are stacked, wherein
   a manifold portion-side end portion of the porous passage has a gas inlet at least one of stacking surfaces of the porous passage that face in the stacking direction,
   the fuel cell further comprising:
   a sealing member that is disposed between an outer end surface of the membrane electrode assembly and the manifold portion; and
   a shield member that is disposed between the sealing member and the porous passage, wherein
   a manifold portion-side end portion of the shield member extends further outward, with respect to the membrane electrode assembly, than a manifold portion-side end portion of the sealing member.

2. The fuel cell according to claim 1, wherein the manifold portion-side end portion of the shield member extends further outward, with respect to the membrane electrode assembly, than the manifold portion-side end portion of the porous passage.

3. The fuel cell according to claim 1, wherein
   a manifold portion-side end portion of one of the anode and cathode that is in contact with the porous passage extends further outward, with respect to the membrane electrode assembly, than a manifold portion-side end portion of the sealing member.

4. The fuel cell according to claim 1,
   wherein a separator having a projecting portion is disposed on one side of the membrane electrode assembly with the porous passage interposed between the separator and the membrane electrode assembly,
   the manifold portion and a space formed by the projecting portion of the separator communicate with each other, and
   the porous passage is provided such that a manifold portion-side edge of the porous passage is located at a position within a width of the projecting portion of the separator.

5. A fuel cell stack comprising the fuel cell according to claim 1.

6. A fuel cell comprising:
   a membrane electrode assembly including an electrolyte membrane, an anode disposed on one side of the electrolyte membrane, and a cathode disposed on the other side of the electrolyte membrane;
   a porous passage that is disposed on at least one side of the membrane electrode assembly, and through which a fuel gas is supplied to the anode or an oxidant gas is supplied to the cathode; and
   a manifold portion, through which the fuel gas or the oxidant gas is supplied to the porous passage, and that is provided so as to pass through the fuel cell in a stacking direction, in which the electrolyte membrane, the anode, the cathode, and the porous passage are stacked, wherein a manifold portion-side end portion of the porous passage has a gas inlet at least one of stacking surfaces of the porous passage that face in the stacking direction, wherein the manifold portion-side end portion of the porous passage projects into the manifold portion.

7. The fuel cell according to claim 6, wherein the manifold portion-side end portion of the porous passage extends outward with respect to the membrane electrode assembly further than a sealing member that is disposed between an outer end surface of the membrane electrode assembly and the manifold portion.

8. The fuel cell according to claim 6, wherein the manifold portion extends in a stacking direction of the fuel cells.

9. The fuel cell according to claim 6, wherein the porous passage does not cover the entire manifold portion.

* * * * *